United States Patent [19]
Thompson

[11] 3,934,311
[45] Jan. 27, 1976

[54] OYSTER BREAKER OPERATED BY ELECTRIC MOTOR HAVING BEARING SEAL DEVICE

[76] Inventor: John W. Thompson, Box 1946, R. D. No. 5, York, Pa. 17405

[22] Filed: Oct. 15, 1974

[21] Appl. No.: 514,619

Related U.S. Application Data

[63] Continuation-in-part of Ser. No. 379,058, July 13, 1973, abandoned.

[52] U.S. Cl. .................................. 17/74; 277/59
[51] Int. Cl.² .................................. A22C 29/04
[58] Field of Search ............. 17/71, 74, 75; 277/59, 277/17–19

[56] References Cited
UNITED STATES PATENTS

| | | | |
|---|---|---|---|
| 1,109,826 | 9/1914 | Doble | 277/18 |
| 2,470,960 | 5/1949 | Tremolada | 277/18 |
| 3,514,114 | 5/1970 | Monahan | 277/3 |
| 3,521,890 | 7/1970 | Holmes et al. | 277/35 |
| 3,605,180 | 9/1971 | Harris et al. | 17/74 |
| 3,828,398 | 8/1974 | Harris et al. | 17/74 |
| 3,840,940 | 10/1974 | Briddell et al. | 17/74 |

*Primary Examiner*—Robert I. Smith
*Attorney, Agent, or Firm*—C. Hercus Just

[57] ABSTRACT

An oyster breaker having a housing provided in one end with an opening through which the lip of an oyster is inserted to be engaged by a rotatable disc within the housing having a shearing member projecting therefrom to shearingly engage said lip of the oyster and form an opening to receive the blade of an oyster knife and facilitate opening the oyster, said disc being mounted on one end of the shaft of an electric motor immediately adjacent said oyster breaker housing, said motor having a housing provided with an opening in one end in which a bearing for the end of said shaft upon which said disc is mounted and said opening in said motor housing, outwardly from said bearing, having multiple seal means specifically designed to prevent the ingress of harmful substances normally produced in the shucking of oysters from gaining ingress to said bearing.

4 Claims, 2 Drawing Figures

OYSTER BREAKER OPERATED BY ELECTRIC MOTOR HAVING BEARING SEAL DEVICE

BACKGROUND OF THE INVENTION

This application is a continuation-in-part of Ser. No. 379,058, filed July 13, 1973 and now abandoned.

Many types of seals for the shafts of electric motors have been devised heretofore. These also include lubricant reservoirs surrounding the shaft in various ways. Included among such prior devises are the seal means comprising the subject matter of the following patents;

| Ser. No. | | |
|---|---|---|
| 3,075,780 | Mayer | Jan. 29, 1963 |
| 3,514,114 | Monaham | May 26, 1970 |
| 3,521,890 | Holmes et al | July 28, 1970 |
| 3,552,875 | Bond | Jan. 5, 1971 |

Although the seal means shown in said aforementioned patents show lubricant-containing seal structures, they do not permit the flushing of lubricant between flanges of lip seals which are spaced longitudinally along the shaft for slidable engagement therewith and define a lubricant reservoir there-between in a manner that when the reservoir is being charged with grease-type lubricant under pressure, one of the flanges serves as a one-way valve to prevent ingress of lubricant to the bearing of the motor, while permitting lubricant under pressure to be forced between the inner periphery of the flange of the other lip seal and the shaft. In addition, seal means of said patents do not provide further seal means engageable with the exterior surface of a motor housing, for example, to augment the sealing capacity of the lubricant reservoir between the spaced flanges of said lip seals. Moreover, none of these patents or any others known to applicant suggest the use of bearings with seal means in an oyster breaker to protect the bearings from the corrosive effect of salt water and oyster liquor.

SUMMARY OF THE INVENTION

It is the principal object of the present invention to provide in an oyster breaker, seal means in an opening in one end of an electric motor in the housing of such breaker through which the corresponding end of the drive shaft of the motor extends for driving connection to a rotatable oyster breaker member driven by said motor within said housing of an oyster breaker, said opening comprising a cylindrical wall evenly spaced from and coaxial with said shaft to provide accommodation for said seal means which preferably comprises a pair of similar lip seals formed from conventional rubberlike material secured within annular metal channels and having flanges extending from said channel toward the shaft in a sloping direction toward the outer end of the shaft and defining a lubricant reservoir therebetween with which a lubricant inlet opening communicates, whereby when lubricant, such as grease, is forced under pressure into said reservoir, the flange on the innermost lip seal serves as a one-way valve to prevent the passage of said lubricant to the interior of the motor housing and the bearing for the shaft, while at the same time permitting the passage of lubricant between the inner periphery of the flanges of the outermost lip seal and the shaft to flush the same with lubricant and most importantly, provide an effective seal against the ingress of said aforementioned corrosive liquids such as salt water and oyster liquor which have very harmful and destructive effects upon the motor bearing which is nearest the rotatable breaker member of the oyster breaker.

Another object of the invention is to provide said oyster breaker bearing with an additional seal means engageable with the outer surface of the metal channel of the outermost lip seal, said additional seal means comprising a V-type flexible and compressible seal member having a frusto-concial flange thereon and mounted on the motor shaft and rotating therewith so that the rim of said flange slideably engages the outer wall of the metal channel of the outermost lip seal, thereby providing both a slinger member to propel corrosive liquids or other ambient material away from the end of the motor, and an additional lubricant-receiving reservoir to augment the sealing effect of the first-mentioned lubricant-reservoir.

A further object of the invention is to provide said oyster breaker with a fitting at the inlet end of the lubricant passage, said fitting being of the type adapted to be engaged by a grease gun or the like to force preferably grease-type lubricant into said passage and the lubricant reservoirs of the seal structure, said fitting being of the type adapted to prevent the escape of lubricant from the passage and reservoirs.

Details of the foregoing objects and of the invention are set forth in the following specification and are illustrated in the accompanying drawing comprising a part thereof.

DETAILED DESCRIPTION

Figure 1:
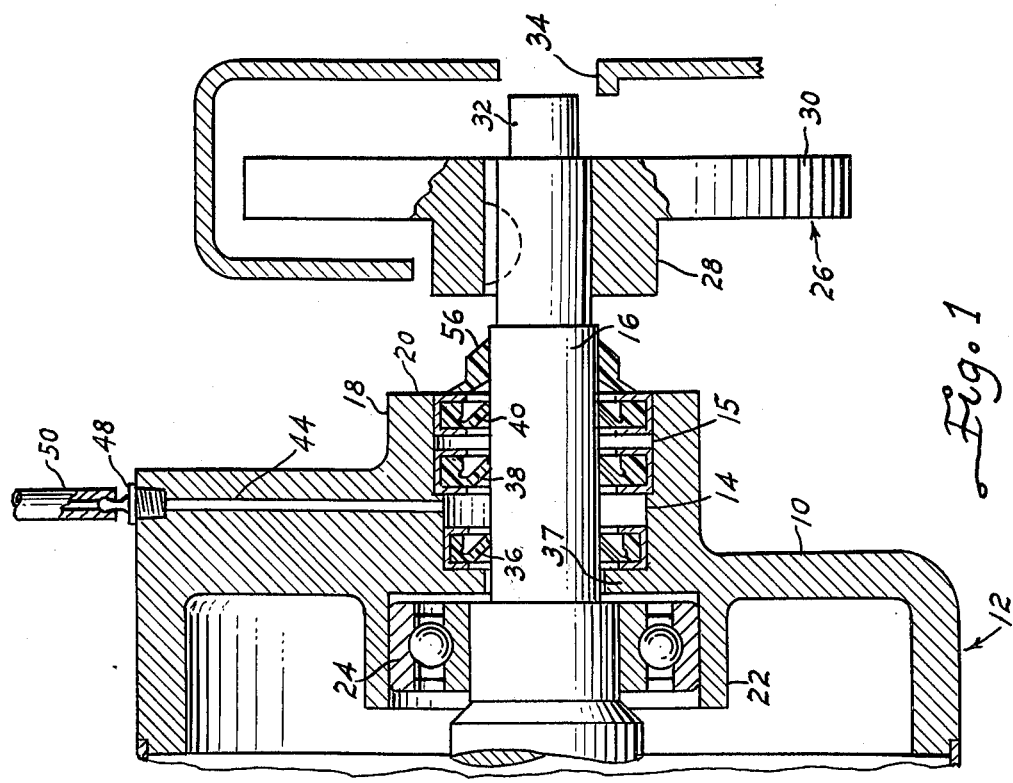
FIG. 1 is a fragmentary vertical sectional view of one end portion of an oyster breaker and the corresponding end portion of an exemplary electric motor having a bearing in one end of the motor housing, and seal means disposed around the end of the shaft which projects through said one end of the motor housing, said seal means enbodying the principals of the present invention.

An oyster breaker operated by an exemplary electric motor is illustrated fragmentarily in FIG. 1 to show the preferred manner in such breaker in which the bearing sealing means comprising the present invention is applicable. Referring to said figure, an end wall 10 of an electric motor housing 12 within an oyster breaker is shown which is provided with a shaft having stepped diameters 14 and 15 of different dimensions through which one end of a shaft 16 projects. The opening terminates in a boss 18 which has a smooth, outer surface 20.

Projecting inwardly from the end wall 10 is a cylindrical seat member 22 which receives an anti-friction bearing unit 24 of the type having rotatable balls therein. Further, the bearing unit 24 preferably is of the sealed type. However, notwithstanding the fact that bearing units 24 of the sealed type have been employed heretofore in situations where reactive substances and atmospheres of corrosive nature contacted the same, said bearings were adversely affected, to such extent that the bearings were completely ruined and had to be replaced. Portions of an oyster breaker 26, which represent the present invention, are illustrated fragmentarily in FIG. 1, in which the outer end of the shaft 16 is shown received within the hub 28 of a disc-like rotatable breaker member 30 which is shown having a shearing member 32 connected thereto for engagement with an oyster when the lip end thereof is introduced through the opening 34 of a housing 35.

Oysters normally grow in salt water and, correspondingly, oyster houses in which the oysters are shucked, usually are near salt water so that the natural liquor, as well as the residue of the salt water in which the oysters grow, the general salt air atomsphere, as well as sand, grit, and oyster shell fragments are all of a corrosive or abrasive nature and have been found to migrate through the shaft opening of the oyster breakers and attack the bearing unit 24, with disastrous results. Accordingly, the purpose of the present invention is to provide a seal within and adjacent the shaft opening 14, 15 in the end wall 10 to prevent ingress of deleterious corrosive substances or atmosphere of an ambient nature into the interior of the motor housing 12. Details of the preferred consturction of such seal are as follows.

Figure 2:
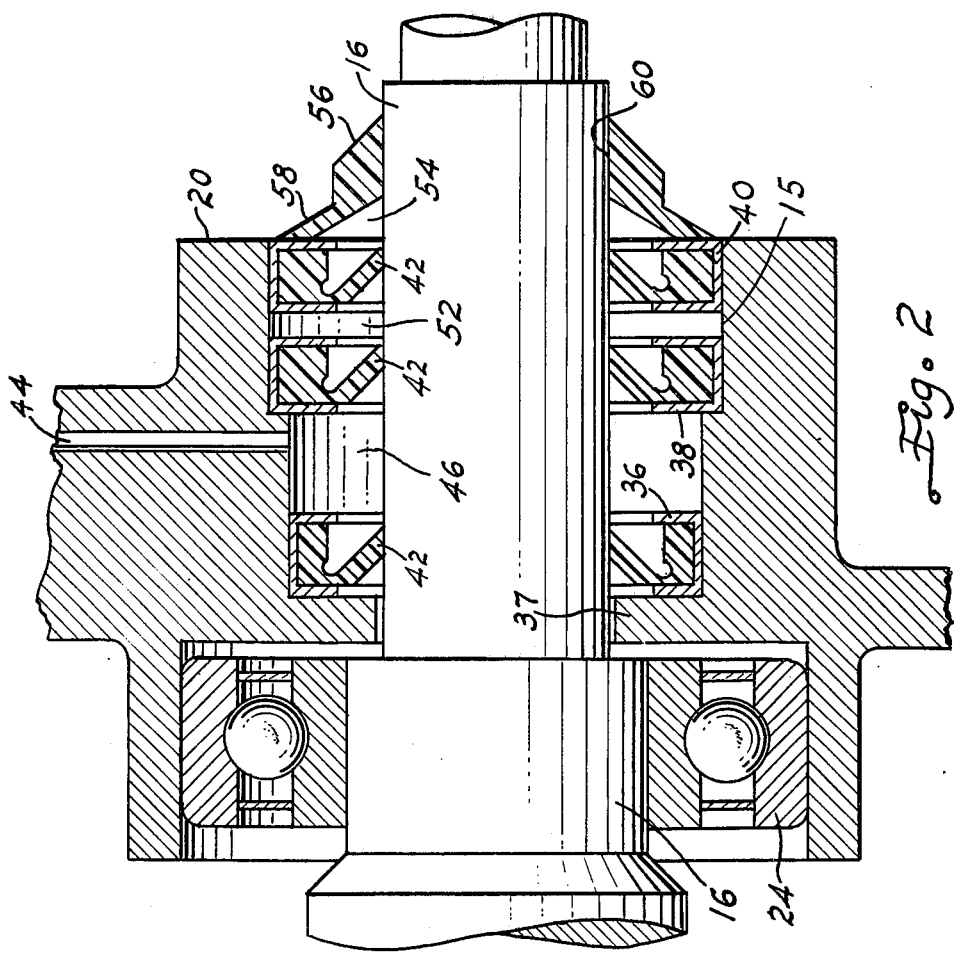
FIG. 2 is a fragmentary vertical sectional view illustrating on a larger scale than in FIG. 1 details of the seal means which are positioned adjacent the bearing for one end of the shaft of the motor of the oyster breaker illustrated in FIG. 1.

The principal elements comprising the aforementioned seal are best illustrated in FIG. 2 in which a fragmentary, vertical elevation, on a substantially larger scale than used in FIG. 1, illustrates the various elements comprising the seal. Mounted within the stepped shaft opening 14, 15 is a a number of sealing rings preferably comprising lip seals 36, 38 and 40. Preferably, said lip seals are substantially identical. Each seal comprises an outer annular metal channel within which is mounted a flexible annular body having a conical flange 42 extending inward from said annular body for slidable engagement with the shaft 16. All of said flanges 42 extend angularly away from the bearing 24, as clearly shown in FIG. 2. The inner terminal edge of each flange 42 has close wiping contact with the shaft 16 as the same rotates relative to the stationary housing 10.

The metal channel of seal 36 is pressed into opening 14 until it abuts housing flange 37 to thereby fixedly position the seal relative to the motor housing. The intermediate seal 38 is pressed into opening 15 until it abuts the shoulder 39 of the housing and thereby fixedly positions said seal relative to the housing in spaced relation to seal 36 and thereby forms a lubricant chamber or reservoir 46 therebetween which has a lubricant passage 44 extending thereto within the endwall of the motor housing. A lubricant inlet fitting 48 is fixed to the outer end of passage 44 which is of the type to which a grease gun or nozzle member may be applied for the delivery of lubricant, preferably grease, under pressure, to reservoir 46. The flexible members of seals 36, 38 and 40 are formed from compositions of the type from which many commercial types of O-ring seals are formed, suitable types of synthetic rubber, such as the Buna type, being preferred so as to be unaffected by grease type lubricants for example.

In accordance with the principals of the invention, the sealing effect of the lip seals 36, 38 and 40 is augmented by employing a grease-type lubricant which is introduced through passage 44 to the lubricant chamber 46.

In accordance with the invention, it is an important feature that when the grease referred to is delivered under pressure to the chamber 46, the pressure of the grease against the angularly extending flange 42 of lip seal 36 presses the terminal edge of the flange 42 tightly into engagement with shaft 16 and thereby prevents grease from passing between the flange 42 and shaft 16 into the area occupied by the bearing unit 24. However, grease, when under pressure, can move against the flange 42 of the intermediate lip seal 38 and be forced between the terminal edge of said flange 42 and the shaft 16, outwardly toward the outer end of said shaft, and thereby cause grease to be discharged into the smaller, supplementary lubricant chamber 52 which is between the flanges 42 of the lip seal 38 and additional lip seal 40. Such passage of the lubricant is caused by the pressure of the same expanding the inner rim of the flange 42 of lip seal 38 sufficiently to cause the grease type lubricant to move into the supplementary lubricant chamber 52 between seals 38 and 40. Continued pressure exerted upon the grease in annular lubricant chamber 46 will also cause the inner rim of the flange 42 of outermost lip seal 40 to be flexed and expanded sufficiently to cause the grease type lubricant to move into additional lubricant chamber 54.

Upon the application of pressure upon the lubricant terminating, the inherent resilience of the flanges 42 of the lip seals 36, 38 and 40 will cause the inner rims of said flanges thereof again to be disposed in close slideable engagement with the surface of shaft 16. To form the additional reservoir 52, the annular metal channel of outermost lip seal 40 is forced into opening 15 only until the outer wall of the channel is flush with end surface 20 of boss 18.

Still another retainer and seal member 56 is provided by the present invention for several important reasons. The configuration of member 56 is shown in cross section in FIG. 2. It is what is referred to as a V-type seal member due essentially to the fact that it has a frusto-conical flange 58 on the end thereof nearest the surface 20 of boss 18 and the terminal edge of the flange 58 is in slideable engagement with the smooth outer surface of the metal channel member of lip seal 40. The member 58 also preferably is made from material similar to that from which the flexible portion of lip seals 36, 38 and 40 are formed and the diameter of the substantially cylindrical inner surface 60 of member 58 is slightly smaller than the outer diameter of shaft 16 so that the seal member 56 is firmly and frictionally maintained in desired axial position upon the shaft 16. When mounting the seal member 56 upon the shaft, it preferably is moved axially toward the surface 20 until the terminal edge of the flange 58 of member 56 is in close slideable engagement with the channel member of lip seal 40.

From the foregoing, it therefore will be seen that the flanges 58 of the seal member 56 defines the outer end of the additional lubricant chamber 54. When charging the various lubricant chambers with grease type lubricant, it is preferred that all of said chambers be filled with grease until the grease starts to discharge between the terminal edge of flange 58 and the outer surface of the channel of lip seal 40. When this occurs, it can be concluded that all of chambers are substantially filled with grease type lubricant. Such charging or loading of said chambers with lubricant is of a flushing nature in that the lubricant is flushed from the initial chamber 46, beneath the flanges 42 of the lip seals 38 and 40, and finally is flushed into the additional lubricant chamber 54 and preferably slightly between the terminal edge of flange 58 thereof and the outer surface of the channel of lip seal 40.

Of even greater importance than the formation of additional reservoir 54 by flange 58 is the fact that, when the same is rotating at high speeds with shaft 16, it acts as a slinger seal to fling off ambient substances which may contact the same and thereby augment the sealing effect afforded by lip seals 36, 38 and 40 and the grease in reservoirs 46, 52 and 54.

The entire arrangement also is such that, in use, the lubricant contained within the various chambers 46, 52 and 54 will minimize wear of the inner rims of the flanges 42 of the various lip seals 36, 38 and 40 as well as the peripheral edge of the flange 58 of the combination retainer and seal member 56. Because of such close slideable engagement of the flanges 42 of the lip seals with the shaft and also the close slideable engagement of the flange 58 with the outer surface of the metal channel of lip seal 40, coupled with the fact that the aforementioned lubricant chambers 46, 52 and 54 normally are substantially filled with grease type lubricant, it will be seen that all of said flanges form barriers against the ingress of any ambient substances through the opening 14 and into the interior of the motor and especially into contact with the bearing unit 24. This sealing function is further augmented by the slinger seal effect afforded by flange 58 when rotating.

From the foregoing, it will be seen also that the angular disposition of the flange 42 of innermost lip seal 36, which extends angularly in the same direction as the flanges 42 on lip seals 38 and 40, causes the flanges 42 of lip seal 36 to serve as a one-way valve, in effect, and thus prevent any flow of lubricant between said flange 42 and shaft 16, thus insuring that the lubricant when introduced through the passage 44, under pressure, will be flushed from the initial lubricant chamber 46 into and through the supplementary lubricant chamber 52 and finally into the additional lubricant chamber 54, preferably filling all of said chambers to augment the sealing affect of the flanges 42 and 58 which in themselves principally serve as barriers as well as means to retain the lubricant within said chambers when the shaft 16 is rotating, thereby protecting the bearing of the oyster breaker which is nearest breaker member 30 against chemical destruction.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. An oyster breaker comprising in combination, a housing having an opening through which the lip of an oyster is to be inserted, a rotatable shearing disc member having a shearing member projecting from one face thereof and cooperable with an edge of said opening to shear a portion of the lip of an oyster therefrom to form an opening for the insertion of an oyster knife therethrough, an electric motor mounted directly adjacent said housing and having a shaft with one end projecting into said housing, said rotatable shearing disc being mounted upon said one end of said shaft of said electric motor, said motor having a housing provided with a cylindrical opening in one end complementary to and through which said one end of the motor shaft projects for connection of said shearing disc thereto immediately adjacent said opening, and a bearing within said housing adjacent said opening to support said end of said motor shaft, in combination with seal means for said end of said shaft to prevent ambient liquid substances originating during the opening of oysters by said shearing disc member and capable of damaging said bearing and shaft from passing through said opening in said motor housing, said seal means extending between the walls of said cylindrical opening and said shaft and comprising a plurality of lip seals of compressible material spaced longitudinally along said walls of said opening and the outer periphery of said lip seals frictionally engaging said walls to secure said lip seals against rotation within said opening, said lip seals each having a similar flange extending integrally and radially from the outer portions of said seals into close slidable sealing engagement with said shaft, said flanges all extending angularly away from said bearing and the space between two of said lip seals and flanges defining a lubricant chamber therebetween, and said motor housing having a lubricant passage extending from the exterior upper portion of said housing downwardly into said lubricant chamber, whereby when lubricant is forced through said passage and into said chamber the flange on the lip seal nearest said bearing functions as a one-way valve by being forced into close sealing engagement with said shaft to prevent the passage of lubricant past said flange but lubricant being capable of passing between the flange on the other lip seal of said two lip seals and moving along said shaft to flush the engagement of the flange of said other lip seal with said shaft and thereby form a barrier seal to prevent ingress of said aforementioned ambient substances through said lubricant chamber.

2. The oyster breaker and electric motor according to claim 1 further including an additional V-type flexible and compressible seal member fixed to said shaft and having a frusto-conical flange extending axially toward said housing and slidably engaging an outer face surface thereof in additional sealing relationship, said flange being operable to retain lubricant between the inner surfaces thereof and said shaft to provide additional barrier means to bar the ingress of ambient substances through said opening for said shaft in said housing and said flange when rotated by said shaft being operable as a sling seal to prevent ingress of ambient substances into said shaft opening.

3. The combination according to claim 2 in which said lip seals include an annular rigid channel engageable with the walls of said shaft opening frictionally, and said flange of compressible material being fixed to said channel and extending to said shaft, the channel of the outermost lip seal being adjacent the outer end of said shaft opening and engaged by said V-type seal member to define an additional lubricant chamber adapted to receive and retain lubricant when said shaft opening is flushed with lubricant to fill said lubricant chambers therewith.

4. The oyster breaker and electric motor combination according to claim 1 in which said shaft opening has a plurality of cylindrical surfaces of different diameters each terminating at the inner ends in radial shoulders, the surface of smallest diameter being innermost in said shaft opening, and said lip seals each including an annular rigid channel having compressible material fixed thereto and including said flanges slidably engaging said shaft when said shaft is rotating, said channels respectively frictionally engaging said cylindrical surfaces and substantially abutting said radial shoulders to position said lip seals in axially spaced relation to define said lubricant chamber.

* * * * *